United States Patent [19]

Maringer

[11] 3,842,291
[45] Oct. 15, 1974

[54] CIRCUIT FOR THE SUPPRESSION OF INTERFERENCE PULSES

[75] Inventor: Albert Maringer, Karlsruhe, Germany

[73] Assignee: Siemens Aktiengesellschaft, Munich, Germany

[22] Filed: June 13, 1973

[21] Appl. No.: 369,533

[30] Foreign Application Priority Data
June 16, 1972 Germany.............................. 2229493

[52] U.S. Cl................. 307/236, 328/165, 307/237, 307/255
[51] Int. Cl. ............................................ H03k 1/10
[58] Field of Search ........... 307/236, 262, 237, 255; 328/165

[56] References Cited
UNITED STATES PATENTS
3,466,471  9/1969  Flagg ............................... 307/236 X
3,505,537  4/1970  Giordano ......................... 307/236 X
3,517,213  6/1970  Britton............................. 307/236 X
3,521,083  7/1970  Drushel............................ 307/236 X
3,562,554  2/1971  Feldt................................. 307/236
3,735,154  5/1973  Meeker et al...................... 307/273

*Primary Examiner*—John S. Heyman
*Attorney, Agent, or Firm*—Kenyon & Kenyon Reilly Carr & Chapin

[57] ABSTRACT

A circuit for the suspension of interference pulses such as those resulting from holes in a machine part which is magnetically coupled to a triggering circuit in which the interference pulses, which have polarities opposite to those of the signal to be detected, are used to ground the trigger circuit output when such pulses are sensed.

7 Claims, 2 Drawing Figures

CIRCUIT FOR THE SUPPRESSION OF INTERFERENCE PULSES

BACKGROUND OF THE INVENTION

This invention relates to trigger circuits responsive to an output from a magnetic sensor in general and more particularly to a circuit for use with such trigger circuits which will surpress interference pulses.

It is well known that the position of a rotating machine part can be detected through the use of a magnetic sensing winding the output of which is used to operate a trigger circuit. In such systems a soft iron armature on the machine part is arranged to interact with a magnetic frame, on which an exciter winding has been wound, through an air gap as the armature rotates with the rotating machine part. As the armature approaches the magnetic frame, a positive half wave will be generated and as the armature leaves the vicinity of the magnetic frame a negative half wave will be generated, with the zero crossing from positive to negative occuring at the position where the armature is aligned with the magnetic frame. In response to the output wave form a trigger circuit will provide an output pulse. Such a circuit is described in U.S. Patent application Ser. No. 353,996 filed on Apr. 24, 1973 and assigned to the same assignee as the present invention. During normal operation, as described above, the sensed output will comprise a positive half wave followed by a negative half wave as the machine part is moved relative to the magnetic frame. Such sensing systems are used, for example, on flywheels or the like where it is desired, for example, to determine topdead center in an internal combustion engine. Since flywheels of this sort are also made of a magnetic material, they will have some influence on the sensing circuit. In particular, if the periphery of the flywheel contains holes which have been drilled therein for balancing purposes, these holes can cause a change to be sensed which will cause the trigger circuit to fire and give a false indication. Such holes, however, will result in a wave form which is the opposite of that induced by the soft armature. That is, a hole will cause a negative half wave followed by a positive half wave. The outputs resulting from holes or the like are thus interference pulses and in a system such as that described above where ignition angles are being measured can result in improper firing of an engine. A trigger output should be provided for each time a positive half wave proceeds a negative half wave but not if a negative half wave preceeds a positive half wave. Thus, there is a need to supress these interference outputs to which the trigger will improperly respond.

SUMMARY OF THE INVENTION

The circuit of the present invention makes use of the fact that in interference pulses the negative half wave (or negative pulse) preceeds the positive half wave. (or positive pulse). In essence, the surpression circuit of the present invention generates a supression signal which grounds the output of the trigger circuit in response to the negative going pulse and causes it to be grounded for a period thereafter long enough to encompass the period of the positive going pulse. The resault is that if the positive pulse first appears the trigger responds thereto, and with the output not grounded, it is fed to the output for further use. Thereafter on the negative going pulse the output is grounded and remains grounded for a period at least equal to another half cycle. However, since another positive pulse will not appear for a considerable period thereafter, by the time the soft iron armature again generates a positive pulse the output will no longer be grounded. Should a hole in the flywheel be detected, the negative going pulse will occur first and immediately cause grounding of the output which grounding will remain until after the time period of the positive pulse. When the trigger responds to the positive pulse, the output is connected to ground and thus will have no effect. To acomplish this, the output of a first switching transistor which responded to the negative going half wave is connected to the input of an integrating amplifier whose output is coupled to another switching transistor which is used to ground the output of the trigger circuit. In the preferred embodiment the first transistor is preceded by an amplifier transistor and the trigger transistor in the trigger circuit also followed by an amplifier transistor the output of which is grounded by the switching transistor described above. In the embodiment shown the integrating amplifier comprises an operational amplifier with negative feedback through a capacitor which is shunted by a zener diode. The integration constant of the amplifier is chosen to be smaller for the rising portion of the integrated voltage wave form than for its falling portion. Also shown is the connection of the integrated output to the switching transistor through a pair of diodes in series.

DETAILED DESCRIPTION OF THE PREFERRED EMBODIMENT

Figure 1:
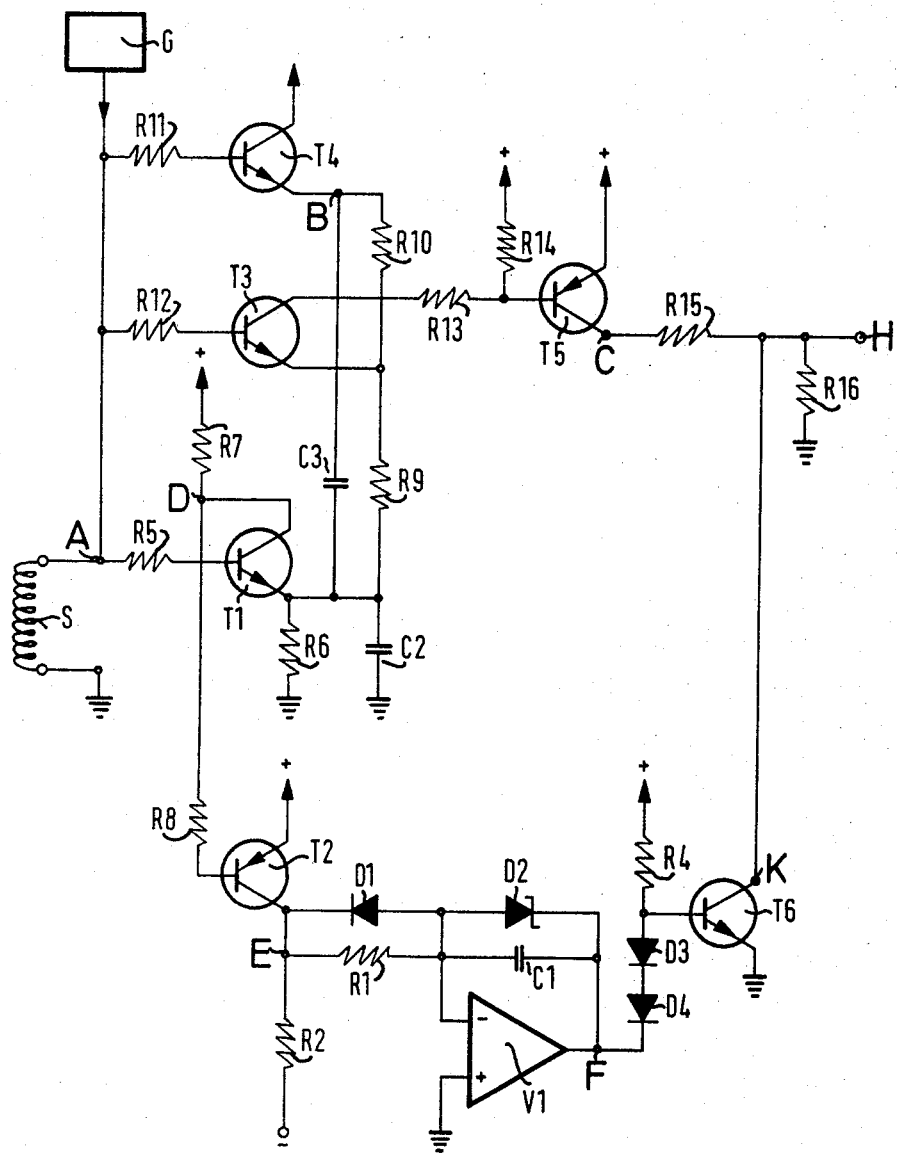
FIG. 1 is a circuit diagram of the preferred embodiment of this invention.

As shown on FIG. 1 the excitation winding S of a magnetic frame (not shown) is connected to a voltage generator D which supplies it with a constant DC voltage. The output of the winding S is connected into the trigger circuit at the point A. The waveforms appearing at the point A are shown on FIG. 2, with the waveform which results from the passage of the soft iron armature designated as 30 and that which results from the passage of a hole as 31. Note that the waveform designated A on FIG. 2 has a constant DC component, i.e., the component supplied by the generator G plus the AC component impressed upon it by the passage of the armature or a hole with respect to the magnetic frame on which winding S is wound. This voltage is provided through a resistor R5 to a transistor T1 which has its collector coupled through a resistor R7 to a positive voltage and its emitter coupled through a resistor R6 to ground. Transistor T1 is used as an amplifier and will provide an output voltage at point D to be described below. The emitter resistor R6 of transistor T1 is shunted by a capacitor C2. This results in the decoupling of the DC voltage at point A and storage thereof by the resistor R6.

A transistor T4 has its base coupled through resistor R11 into point A. Its collector is connected to a positive voltage source and its emitter connected to the emitter of transistor T1 through a capacitor C3 which is in parallel with a voltage divider comprising resistors R9 and R10. As described in the above-identified application, the peak voltage is stored by the capacitor C3. This voltage which then appears across the voltage divider comprised of R9 and R10 is divided so as to cause the trigger transistor T3 to fire at the proper point. As shown, transistor T3 is coupled to point A through a resistor R12 and has its emitter connected to the junction point of the resistors R10 and R9 and its collector coupled through resistors R13 and R14 to a positive voltage.

Figure 2:
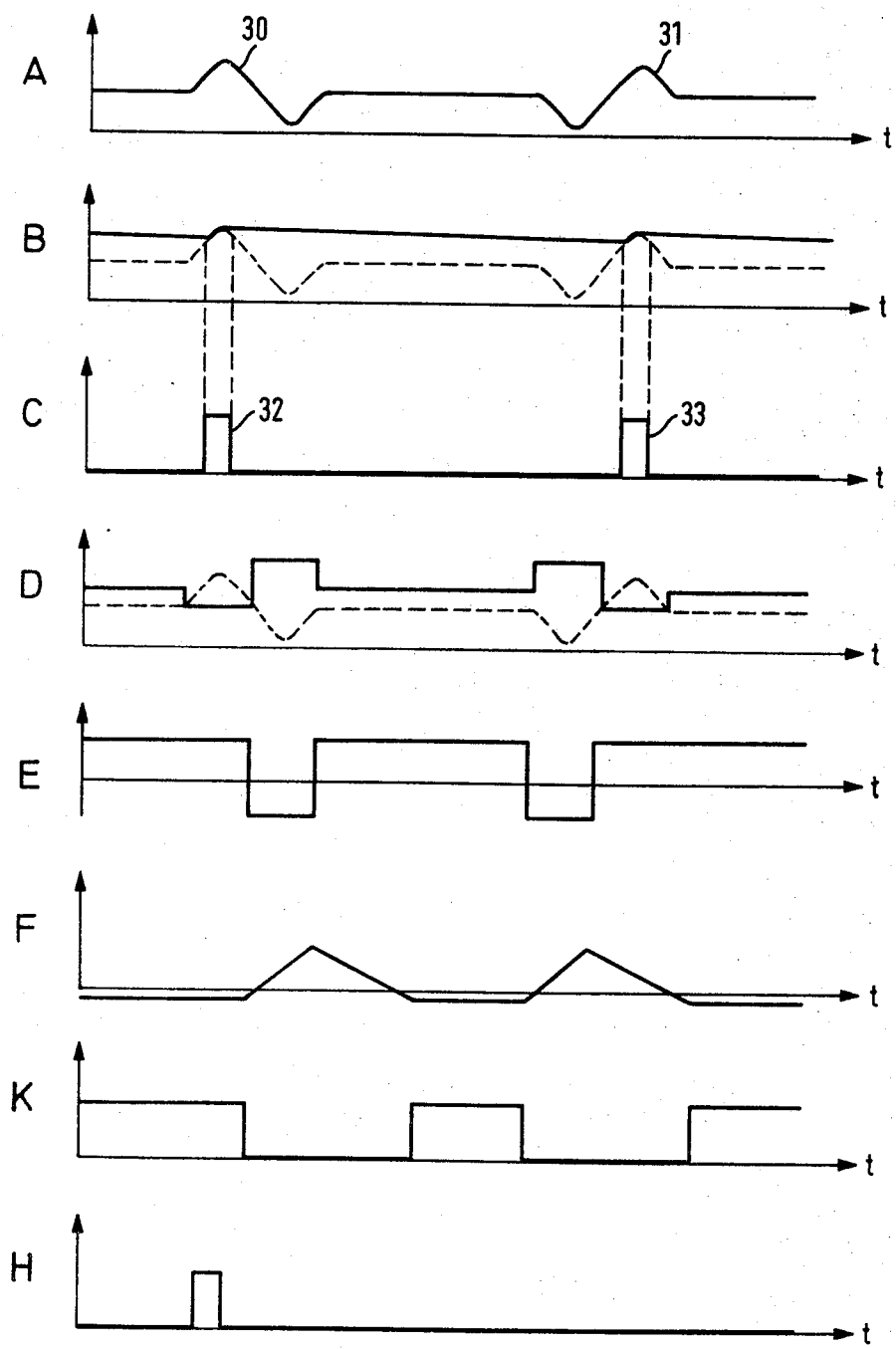
FIG. 2 is a pulse diagram helpful in understanding the operation of the circuit of FIG. 1.

In operation, capacitor C3 stores the amplitude of the positive portions of the waves shown on FIG. 2. The resistor divider comprising R9 and R10 divides this voltage to place on the emitter a predetermined voltage which when exceeded by the positive going voltage at point A will cause the trigger transistor T3 to fire. Its collector output is coupled at the junction of resistors R13 and R14 to the base of an amplifier transistor T5 which in turn has its emitter coupled to a positive voltage and its collector connected to ground through resistors R15 and R16. The trigger output is taken off at the junction of these two resistors designated as H. The stored voltage across capacitor C3 which appears at the point B is shown by the waveform B of FIG. 2. As shown, the maximum peak of the waveform A is essentially stored by this capacitor.

The firing of the transistor T3 which in turn turns on transistor T5 is represented by the wave form C representing the output at point C of FIG. 1. Note that the trigger circuit fires whether the positive half of the waveform preceeds the negative half or comes after the negative half. The first trigger pulse 32 is a proper trigger pulse and should be provided as an output. The second trigger pulse 33 is an interference pulse and must be suppressed. The remainder of the circuit of FIG. 1 is used for interference pulse suppression.

The output of transistor T1 at point D is the input to the suppression circuit. This waveform is shown as D on FIG. 2. As shown thereon, transistor T1 essentially outputs a square waveform corresponding to the sinusoidal waveform of A, but inverted. This output is provided through a resistor R8 to transistor T2 which has its emitter coupled to a positive voltage and its collector coupled through a resistor R2 to a negative voltage. Transistor T2 is arranged so that in response to a negative or zero voltage it will be turned on and have a positive output. However, when transistor T2 responds to the negative portion of the waveform providing a more positive output, transistor T2 will be turned off and the voltage at its collector output will become negative. This is illustrated by the waveform E representing the voltage at the collector output E of transistor T2. Note that each time at the input point A, a negative going half wave occurs the collector output of transistor T2 also goes negative. The output at point E is coupled through a resistor R1 to the inverting input of an amplifier V1 which has its non-inverting input grounded. The output of amplifier V1 is fed back through a capacitor C1 having a zener diode D2 in parallel therewith, to the inverting input. A diode D1 is in parallel across the resistor R1. Prior to the occurrence of the negative going pulse at point E, the positive voltage through resistor R1 will be inverted in the amplifier and cause a negative output. The integrator will have integrated to the point where the forward voltage of zener diode D2 is reached and will be limited at that point. When the negative pulse occurs it will be provided through the diode D1 (and resistor R2) to the inverting input of the amplifier V1 and integration will occur with a gradually increasing positive voltage at the output. The output at point F is illustrated by the waveform F of FIG. 2. This output will be limited by the breakdown voltage of zener diode D2. At the end of the negative pulse at point E the positive voltage will again be provided through resistor R1 to the inverting input causing an integration in the opposite direction. Through proper selection of R1, this integration can be selected to have a time constant causing it to occur at a slower rate than the integration through the diode D1. Thus, observing the relationship of waveform F to waveform A and C in particular, it will be noted that for the input pulse 30 which will result in a trigger output 32, the output at point F is at its slightly negative level with the positive integration not occurring until after occurrence of pulse 22, i.e., when the negative half of wave form 30 appears. For the wave form 31 the negative half first appears causing an immediate integration raising the level at point F above ground and making it positive. Because of the long time constant obtained through the resistor R1, this positive voltage will still be present when the output pulse 33 occurs in response to the positive half cycle of the waveform 31.

The output F of the integrating amplifier V1 is coupled through two diodes D3 and D4 to the base of a transistor T6. The base is also coupled through a resistor R4 to a positive voltage and has its emitter grounded and its collector connected to the junction of resistors R15 and R16 which is the output H of the trigger circuit. Prior to the appearance of the negative pulse at point E and the resulting integration as evidence by the waveform F, the output at point F will be approximately −0.7 volts. Through the diodes D3 and D4 this will result in a voltage at the base of transistor T6 which will cause it to remain in the off condition. When the integration commences, the positive voltage at the base of T6 will cause it to switch on. The diodes D3 and D4 compensate respectively for the base to emitter junction of transistor T6 and the forward voltage of the zener diode D2. Thus, switching will occur almost immediately upon the beginning of integration. With transistor T6 turned on, the junction of resistors R15 and R16 at point H will be grounded.

In effect, as illustrated by the waveform K, the output will be enabled only when the output of amplifier at point F is at its negative voltage. Waveform K shows a positive voltage during the periods when the integrator output is negative and a zero voltage during the period of integration. It is shown this way for illustrative purposes only since in actuality the voltage appearing at point H is the same as that at point K. That is to say, the wave form K illustrates the voltage which would be present at that point if transistor T5 were always turned on.

The final result is illustrated by the wave form H. The pulse 32 of wave form C which is generated in response to the positive half of the wave form 30 will occur at a time when the transistor T6 is turned off and thus will be provided at the output. However, the pulse 33 of wave form C which is generated in response to the positive half of the wave form 31 and which is an interference pulse will occur at a time when the transistor T6 is turned on and the output H is grounded. Thus, the pulse will not reach the output but will be coupled directly to ground.

The illustrated circuit can process pulse length differences of a range of 1 to 100 with error. A large ratio of inteference signals to useful amplitudes is not required since the inteference signal is completely blanked out no matter what its magnitude.

Thus, an improved circuit for blanking inteference pulses in a trigger circuit which responds to a excitation winding on a magnetic frame has been shown. Although a specific embodiment has been illustrated and described, it will be obvious to those skilled in the art that various modifications may be made without departing from the spirit of the invention which is intended to limited solely by the appended claims.

What is claimed is:

1. An interference suppression system comprising:
   a sensing device which periodically produces a first occurring full wave consisting of a positive halfwave portion and a negative halfwave portion;
   a trigger circuit coupled to said sensing device and responsive to only the first occuring halfwave portion of said positive and negative halfwave portions of said first occuring full wave;
   said circuit comprising:
   a. a first switching transistor responsive only to the halfwave portion of polarity opposite to that of said first occuring halfwave;
   b. an integrator having an input connected to the output of said first switching transistor; and
   c. a second switching transistor connected between the output of said integrator and said trigger circuit output to short-circuit the output of the trigger circuit for the duration of said integrator output thereby suppressing interference pulses that would otherwise be generated as a result of said interference signals.

2. The invention according to claim 1 wherein said first switching transistor is coupled through a first amplifier transistor responsive to said one of said halfwaves.

3. The invention according to claim 2 wherein the trigger circuit includes a trigger transistor and further including a second amplifier transistor between said trigger transistor and the trigger circuit output.

4. The invention according to claim 3 wherein said integrator comprises an operation amplifier having a capacitor between its output and its inverting input.

5. The invention according to claim 4 and further including a Zener diode in parallel with said capacitor.

6. The invention according to claim 5 wherein the output of said first switching transistor is coupled to the input of said integrator through a diode and resistor in parallel whereby said integrator integrates in one direction in response to said first switching transistor responding to said first switching transistor is not responding and said resistance and diode in parallel cause the integration constant in said one direction to be smaller than that for said other direction.

7. The invention according to claim 6 wherein said integrator output is coupled to the base of said second switching transistor through a pair of diodes in series, the polarity of said diodes being in the cut off direction with respect to the voltage provided by integrating in said one direction.

* * * * *